Sept. 4, 1934.   O. E. ANDRUS   1,972,728
METALLIC VESSEL
Filed Oct. 4, 1930

INVENTOR.
Orrin E. Andrus
BY
ATTORNEY.

Patented Sept. 4, 1934

1,972,728

UNITED STATES PATENT OFFICE 1,972,728

METALLIC VESSEL

Orrin E. Andrus, Wauwatosa, Wis., assignor to A. O. Smith Corporation, Milwaukee, Wis., a corporation of New York Application October 4, 1930, Serial No. 486,503

10 Claims. (Cl. 73—51)

This invention relates to the construction of metallic vessels which are subjected to corrosion in use as in the oil cracking or chemical industry, although the invention in its broader aspect may be applied to the construction of any metallic surface which is subjected to corrosion in use.

The invention resides in a novel construction of the vessel whereby the corrosion of the metal at the surface thereof may be readily determined in testing the safety of the vessel for further use.

In another phase, the invention resides in a means for testing the amount of corrosion of a metal surface without necessitating an actual measurement of the remaining thickness of metal.

Preferred embodiments of the invention are illustrated in the accompanying drawing in which the views are as follows.

Figure 2:
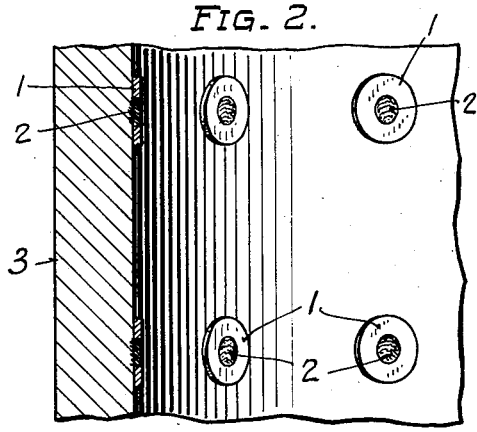
Fig. 2 is an enlarged section through the vessel wall showing a portion of the interior surface.
Figure 3:
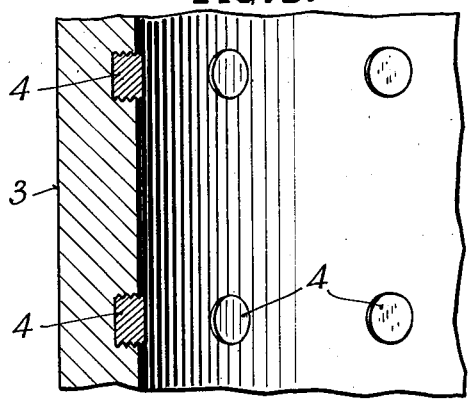
Figure 4:
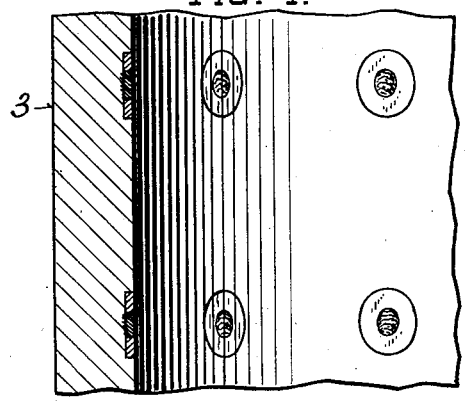
Figure 5:
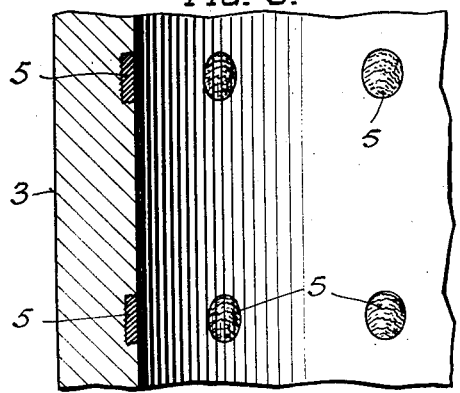

Figs. 3, 4, and 5 are views similar to Fig. 2 illustrating modified forms of the invention.

In chemical processes, paper and oil cracking industries, corrosion of the vessels employed has become a serious menace to the safety of workmen and equipment. Vessels are manufactured having a thickness beyond that required for physical strength in order to allow for a predetermined amount of corrosion of the vessel wall. This allowance for corrosion generally determines the useful life of the vessel and has been as high as two or more inches in certain cases. When corrosion has reduced the wall thickness to less than that required for physical strength under maximum working pressures the vessel is either discarded or the working pressures are periodically reduced to maintain safe operation.

After such vessels have been in use a predetermined period, it is advisable to shut down operation to inspect the vessel for corrosion. Ordinarily the corrosion is not uniform throughout the inner surface of the vessel and it is therefore usual to test the thickness of the vessel wall at a number of places by boring through the wall and measuring the thickness of the metal thereof. If the vessel is to be used again the holes in the vessel wall are sealed and the vessel again subjected to operation.

In carrying out the present invention, holes are not bored through the vessel wall in order that the remaining wall thickness may be measured, but such remaining wall thickness is accurately determined by measuring the depth to which corrosion has taken place and subtracting this amount from the original wall thickness. In order to determine the depth to which corrosion has taken place, the metal surface subjected to corrosion is provided with a plurality of corrosion resistant members or areas from which the depth of corrosion of the metal surface near such areas may be measured.

Figure 1:
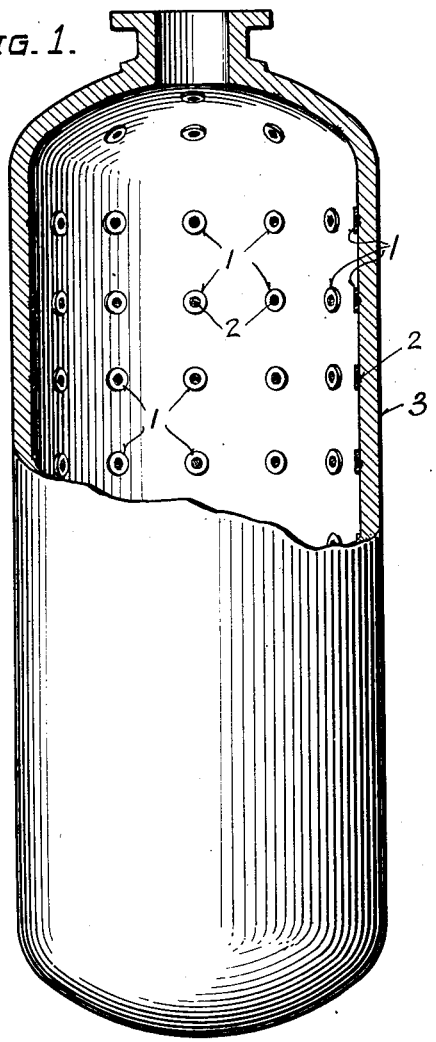
Figure 1 is an elevation of a vessel partly in section.

In Figs. 1 and 2 these corrosion resistant members 1 are illustrated as being disk shaped and are welded at their centers 2 to the vessel wall 3.

The members 1 are preferably of corrosion resistant metal such as chrome-nickel alloy steel, Monel metal, or the like, depending upon the nature of the corroding media, and may be welded to the vessel wall in any suitable manner. Where arc welding is employed it may be preferable to make the member 1 in the form of a washer and to fill the central opening therethrough with deposited weld metal. Where electric resistance welding is employed, no added metal is deposited.

The members may be constructed of non-metallic corrosion resistant material such as porcelain or asbestos board in which case it is preferable for them to take the form of plugs 4, in which case it is advisable to thread the same into the wall of the vessel as illustrated in Fig. 3. The depth to which the members 4 extend is preferably equal to the depth allowed for corrosion of the vessel wall.

In either case the members 1 or 4 may extend outwardly from the surface of the wall a predetermined distance, or the members may be wholly embedded in the wall with their surfaces flush with the surface of the vessel wall. For instance, the washer 1, shown in Figs. 1 and 2, may be embedded in the wall, as shown in Fig. 4, or a weld deposit 5 may be employed filling a hole in the wall, as shown in Fig. 5.

The members may be of any suitable shape and may be fastened to the vessel wall in various ways, the requirement being that the members be accurately made and positioned so that their outer surfaces may be employed as "bench marks" or standards from which to measure the amount of corrosion of the vessel wall at any point between two or more members or adjacent any member.

The members are further employed in determining the amount of creeping or elongation of the vessel wall in use, and also whether the vessel has become warped or out of round, from which determination non-uniform stress conditions may be computed.

Since the members 1 are non-corrodible and may be located at predetermined distances apart, measurements made between them will indicate generally the amount of creeping or elongation of the vessel. Further, when the vessel is fabricated and the bench marks mounted in position, their surfaces lie substantially along a circle. After the vessel has been in use, if the surfaces of these bench marks do not lie in a circle, it is evident that the vessel has become distorted.

While a number of specific illustrations of the invention have been made, the invention is not limited thereto, and various embodiments may be employed within the scope of the invention as defined in the accompanying claims.

I claim:

1. In apparatus for the purpose described, a metallic element having at least one surface for exposure to materials having a corrosive action thereon, a plurality of corrosion resistant members so disposed upon the surface subjected to corrosion as to serve as bench marks from which measurements may be made to determine the extent of the corrosive action.

2. A vessel comprising a metallic shell or wall adapted to be subjected to interior corrosion in use, and a plurality of corrosion resistant members fastened to the interior surface thereof to provide distributed corrosion resistant areas by which the depth of corrosion of the vessel wall may be determined.

3. A vessel comprising a metallic shell or wall adapted to be subjected to corrosion in use, and a plurality of members of corrosion resistant metal welded to the interior surface thereof to provide a marking of the position of said surface prior to corrosion and by which the depth of corrosion of the vessel wall is determined.

4. A vessel comprising a metallic shell or wall adapted to be subjected to corrosion in use, and corrosion resistant means fastened to the wall and exposed at the inner surface of the same for providing a base for inspection measurements.

5. A vessel comprising a metallic shell or wall adapted to be subjected to corrosion in use, and corrosion resistant metal members welded to the inner surface of the same, said members being distributed to provide bases for inspection measurements of said surface.

6. A vessel comprising a metallic shell or wall adapted to be subjected to corrosion in use, and a plurality of corrosion resistant washers welded to the surface thereof to provide distributed corrosion resistant areas by which the depth of corrosion of the vessel wall is determined.

7. A vessel comprising a metallic shell or wall adapted to be subjected to corrosion in use and provided with screw threaded recesses, and a plurality of corrosion resistant threaded plugs each screwed into one of said recesses to provide distributed corrosion resistant areas by which the depth of corrosion of the vessel wall may be determined.

8. In a pressure vessel, a metallic shell adapted to be subjected to corrosion in use, the shell having a plurality of recesses in the interior face of said shell, and corrosion resistant metallic plugs of deposited weld metal in said recesses disposed to serve as bench marks.

9. A reference structure for vessels having metallic surfaces that are subjected to corrosion when in use, comprising members capable of resisting corrosion disposed in predetermined positions relative to the surfaces to provide bench marks from which the depth of the corrosion may be measured.

10. A reference structure for vessels having metallic surfaces that are subjected to corrosion when in use, comprising members capable of resisting corrosion carried by the vessels, said members being mounted in predetermined positions relative to the surfaces that are subjected to corrosion to provide bench marks from which the depth of corrosion may be measured.

ORRIN E. ANDRUS.